United States Patent
Baek et al.

(10) Patent No.: US 11,932,214 B2
(45) Date of Patent: Mar. 19, 2024

(54) PARKING ACTUATOR AND ELECTROMECHANICAL BRAKE INCLUDING THE SAME

(71) Applicant: HL MANDO CORPORATION, Gyeonggi-do (KR)

(72) Inventors: Seungtae Baek, Gyeonggi-do (KR); Joonkyu Song, Gyeonggi-do (KR); Kyungho Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 210 days.

(21) Appl. No.: 17/378,734

(22) Filed: Jul. 18, 2021

(65) Prior Publication Data

US 2022/0024426 A1    Jan. 27, 2022

(30) Foreign Application Priority Data

Jul. 21, 2020    (KR) .......................... 10-2020-0090457

(51) Int. Cl.
| | |
|---|---|
| *B60T 1/06* | (2006.01) |
| *B60T 13/74* | (2006.01) |
| *F16D 55/226* | (2006.01) |
| *F16D 65/18* | (2006.01) |
| *F16D 121/24* | (2012.01) |
| *F16D 125/40* | (2012.01) |

(52) U.S. Cl.
CPC .......... *B60T 13/741* (2013.01); *F16D 55/226* (2013.01); *F16D 65/18* (2013.01); *F16D 2121/24* (2013.01); *F16D 2125/40* (2013.01)

(58) Field of Classification Search
CPC ...... B60T 1/065; B60T 13/746; F16D 55/226; F16D 65/18; F16D 2121/24
See application file for complete search history.

(56) References Cited

U.S. PATENT DOCUMENTS

| | | | |
|---|---|---|---|
| 6,907,965 B2* | 6/2005 | Peter ..................... | B60T 13/746 188/72.8 |
| 10,668,912 B2* | 6/2020 | Kirchner ................ | B60T 1/005 |
| 2017/0001604 A1* | 1/2017 | Al-Regib ............... | B60T 1/062 |
| 2018/0238408 A1* | 8/2018 | Song ....................... | F16D 65/18 |

(Continued)

FOREIGN PATENT DOCUMENTS

| | | | | |
|---|---|---|---|---|
| DE | 102009023498 A1 * | 12/2010 | ............ | B60T 13/746 |
| DE | 102009053526 B4 * | 5/2013 | ............ | F16D 55/226 |
| DE | 102015218411 B3 * | 2/2017 | ............ | B60T 1/005 |

(Continued)

*Primary Examiner* — Vishal R Sahni
(74) *Attorney, Agent, or Firm* — Ladas & Parry, LLP (57) ABSTRACT

Disclosed are a parking actuator and an electromechanical brake including the same. The parking actuator, which is connected to a brake actuator that performs braking of a vehicle, includes a parking gear connected to the brake actuator to be rotatable together, a parking lever having one side hingedly fixed and the other side engaged with the parking gear, a parking motor provided to generate power, a power conversion unit including a spindle member rotating by receiving a rotational driving force of the parking motor and a nut member screwed to the spindle member to move forward or backward, and a pressing unit installed on the nut member to press the parking lever by the nut member moved forward or backward.

14 Claims, 9 Drawing Sheets

(56) References Cited

U.S. PATENT DOCUMENTS

2021/0239211 A1* 8/2021 Stöhr .................... F16D 63/006
2022/0024426 A1* 1/2022 Baek .................... F16D 55/226

FOREIGN PATENT DOCUMENTS

| DE | 102021201344 A1 | * | 8/2021 |
| EP | 0936112 A1 | * | 8/1999 |
| KR | 10-2012-0082603 | | 7/2012 |
| KR | 20150072582 A | * | 6/2015 |

* cited by examiner

PARKING ACTUATOR AND ELECTROMECHANICAL BRAKE INCLUDING THE SAME

CROSS-REFERENCE TO RELATED APPLICATION(S)

This application is based on and claims priority under 35 U.S.C. § 119 to Korean Patent Application No. 10-2020-0090457, filed on Jul. 21, 2020, in the Korean Intellectual Property Office, the disclosure of which is incorporated by reference herein in its entirety.

BACKGROUND

1. Field

The disclosure relates to a parking actuator and an electromechanical brake including the same, and more particularly, to a parking actuator capable of implementing parking braking of a vehicle using a rotational driving force of a motor, and an electromechanical brake including the same.

2. Description of the Related Art

A vehicle is necessarily equipped with a brake system for performing braking, and such a brake system is required to have a parking brake function for maintaining a stopped state of the vehicle when parked, together with a service brake function for providing a braking force in a driving situation of the vehicle.

A foot brake type parking brake driven by pedaling with a foot and a hand brake type parking brake driven by pulling a lever with a hand are mainly used as conventional parking brakes. However, the hand brake type parking brake may not only injure a waist and put strain on an arm, especially for a driver who frequently parks and stops a vehicle because the parking brake lever must be pulled with a lot of force with one hand to operate, but also limit the use of indoor space because the parking brake lever is located in the center of a console.

Therefore, recently, a method for implementing electromechanical braking using an actuator has been developed to generate a braking force using a motor after receiving the braking intention of a driver as an electrical signal by pressing a button, etc.

During parking braking of a vehicle, a parking part such as a piston and a nut-spindle of a caliper brake and a parking brake shoe of a drum brake maintains the braking force. However, when there is a factor that prevents maintenance of parking braking, such as when the vehicle receives an external shock or is parked on a slope, while the parking part maintains the parking braking force, the parking braking state of the vehicle may be released to cause the vehicle to move. Therefore, in order to prevent the vehicle from moving despite the parking braking state, stones or props are sometimes placed between or behind wheels.

In order to maintain the parking braking state when the parking braking function of a vehicle as described above is operated, various locking methods have been developed, such as a separate parking gear is provided in a gear unit of the actuator to maintain a fixed state of the actuator.

Korean Patent Publication No. 10-2012-0082603 has been disclosed as an example of a conventional parking actuator.

SUMMARY

It is an aspect of the disclosure to provide a parking actuator capable of minimizing consumption of current for maintaining a parking braking state of a vehicle, and an electromechanical brake including the same.

It is an aspect of the disclosure to provide a parking actuator capable of ensuring safety by being configured such that the next gear tooth is engaged even in a case where gear teeth are not engaged with each other when a parking gear is fixed, and an electromechanical brake including the same.

It is an aspect of the disclosure to provide a parking actuator capable of being driven even with a small output during operation, and an electromechanical brake including the same.

It is an aspect of the disclosure to provide a parking actuator capable of suppressing a rolling phenomenon of a vehicle during parking braking, and an electromechanical brake including the same It is an aspect of the disclosure to provide a parking actuator having a simple driving method which facilitates a parking operation and a parking release operation, and an electromechanical brake including the same.

Additional aspects of the disclosure will be set forth in part in the description which follows and, in part, will be obvious from the description, or may be learned by practice of the disclosure.

In accordance with an aspect of the disclosure, a parking actuator, which is connected to a brake actuator that performs braking of a vehicle, includes a parking gear connected to the brake actuator to be rotatable together, a parking lever having one side hingedly fixed and the other side engaged with the parking gear, a parking motor provided to generate power, a power conversion unit including a spindle member rotating by receiving a rotational driving force of the parking motor and a nut member screwed to the spindle member to move forward or backward, and a pressing unit installed on the nut member to press the parking lever by the nut member moved forward or backward.

The pressing unit may include a pressing member provided to penetrate through an end of the nut member to be movable relative to the nut member and to press the parking lever, and an elastic member interposed between the pressing member and the nut member to elastically support the pressing member.

The nut member may include a nut body having a female thread engaged with a male thread formed on an outer circumferential surface of the spindle member, and a pin extending in a longitudinal direction from the nut body so that the pressing unit is installed.

The pin may include a stopper extending in a radial direction from an end thereof to prevent separation of the pressing member.

The elastic member may be provided as a coil spring through which the pin penetrates and having one side supporting the nut body and the other side supporting the pressing member.

The nut member may have a rotation preventing surface formed on one side of an outer circumferential surface thereof so as not to rotate together with the spindle member.

The parking lever may be provided with one surface on which a gear tooth is formed to be engaged with the parking gear, and the other surface having a stepped surface formed to be stepped and positioned on an extension line in advancing and retreating direction of the nut member and a pressing surface extending from the stepped surface to be in close contact with the pressing member.

The pressing surface may be bent such that the parking lever gradually rotates toward the parking gear when the pressing member moves forward.

The pressing member may be provided in a cylindrical shape, and a front edge portion of the pressing member may be formed to be bent.

The pressing member may press the parking lever by the advancing movement of the nut member or an elastic force of the elastic member during parking driving to engage a gear tooth of the parking lever with the parking gear.

The power conversion unit may include a first worm gear provided on a rotation shaft of the parking motor, and a second worm gear engaged with the first worm gear and to which the spindle member is coupled to the center thereof.

The parking actuator may further include a housing provided to accommodate the parking gear, the parking lever, the parking motor, the power conversion unit, and the pressing unit, wherein the parking lever may be hingedly fixed to the housing.

The parking actuator may further include a torsion spring provided at a portion to which the parking lever is hingedly fixed and elastically supporting the parking lever to rotate in a direction of being spaced apart from the parking gear.

In accordance with an aspect of the disclosure, an electromechanical brake includes the parking actuator described as above.

The electromechanical brake may further include a driving motor provided to generate a rotational driving force, a reduction gear unit connected to the driving motor to adjust a gear ratio, a power transmission device provided to convert a rotational motion of the reduction gear unit into a linear motion, and a piston provided to receive power from the power transmission device and press a pad plate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
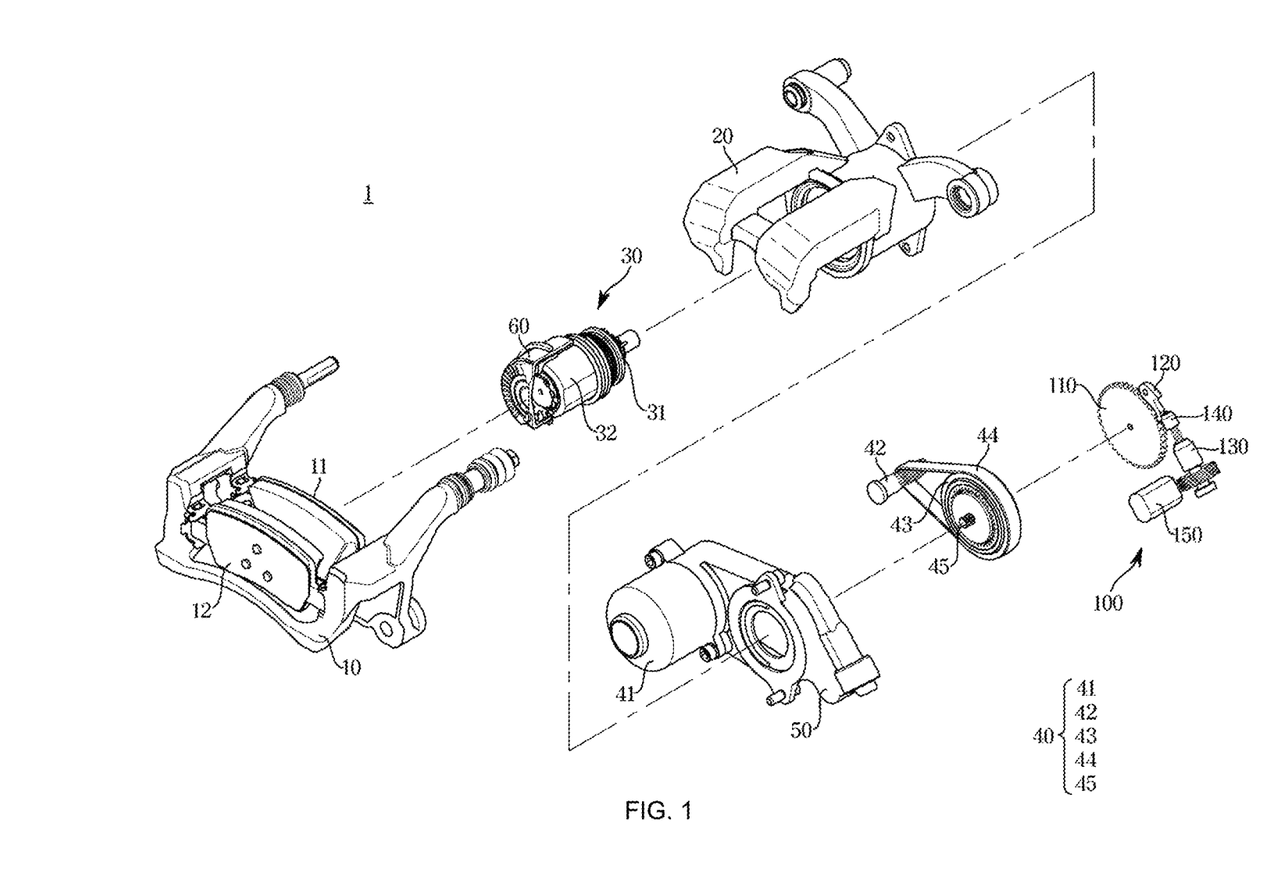
FIG. 1 is a perspective view of an electromechanical brake according to the present embodiment.

FIG. 1 is a perspective view of an electromechanical brake 1 according to the present embodiment.

Referring to FIG. 1, the electromechanical brake 1 according to the present embodiment may include a carrier 10 on which a pair of pad plates 11 and 12 are installed to press a disk (not shown) rotating together with a wheel of a vehicle, a caliper housing 20 slidably installed on the carrier 10 to operate the pair of pad plates 11 and 12, a piston 60 installed inside the caliper housing 20 to move forward or backward, a brake actuator 40 provided to generate a rotational driving force from the driving motor 41 and including a reduction gear unit, a power transmission device 30 configured to perform forward and backward movement of the piston 60 in an axial direction by converting the rotational driving force provided from the brake actuator 40 into a linear motion and transmitting the linear motion to the piston 60, a parking actuator 100 connected to the brake actuator 40 to perform parking braking, and an electronic control unit (ECU, not shown) configured to control the operations of the brake actuator 40 and the parking actuator 100.

A brake pad 10 is attached to an inner surface of each of the pair of pad plates 11 and 12. The pair of pad plates 11 and 12, which are installed on the carrier 10 to be slidably movable, include the inner pad plate 11 having an outer surface disposed to be in contact with a front surface (left surface based on FIG. 1) of the piston 60 and the outer pad plate 12 having an outer surface disposed to be in contact with a finger part of the caliper housing 20.

The capper housing 20 includes the finger part for operating the outer pad plate 12 and a cylinder in which the piston 60 is installed, and is fastened to the carrier 10 to be slidably movable. As the caliper housing 20 slides from the carrier 10 to move toward the disk by a reaction force caused by the movement of the piston 60 when the vehicle is braked, the outer pad plate 12 may approach the disk by the finger part to press the disk.

The brake actuator 40, which is a device for generating a rotational driving force, performs braking of the vehicle by transmitting the driving force to the piston 60 and the pad plate 11 through the power transmission device 30. In this case, the driving of the brake actuator 40 may include not only general braking operated when the vehicle is driven, but also parking braking operated when the vehicle is parked.

The brake actuator 40 includes a driving motor 41 provided to generate a rotational driving force, and a reduction gear unit connected to the driving motor 41 and provided to adjust a gear ratio to slow down a speed but amplify a torque. The reduction gear unit may include a driving gear 42 coupled to a rotation shaft of the driving motor 41, a reduction gear 43 connected to the driving gear 42 to transmit power to the power transmission device 30, and the driving gear 42 and the reduction gear 43 may be connected by a gear belt 44. The rotation shaft of the reduction gear 43 may be coaxially connected to a spindle unit 31 and a parking gear 110.

The power transmission device 30 may include the spindle unit 31 connected to the reduction gear unit to rotate together, and a nut unit 32 screwed to the spindle unit 31 to move forward or backward inside the piston 60.

The parking actuator 100, which is a device connected to the brake actuator 40 to maintain a braking state of the vehicle, maintains the braking state from being released by locking the parking gear 110 connected to the brake actuator 40 in a state in which the piston 60 presses the pad plate 11. In detail, the piston 60 presses the pad plate 11 by the operation of the brake actuator 40 during parking braking of the vehicle so that the brake pad is in close contact with the disk, and at this time, the parking actuator 100 operates such that the braking state is maintained without being released by fixing the parking gear 110 connected to the reduction gear unit.

Figure 2:
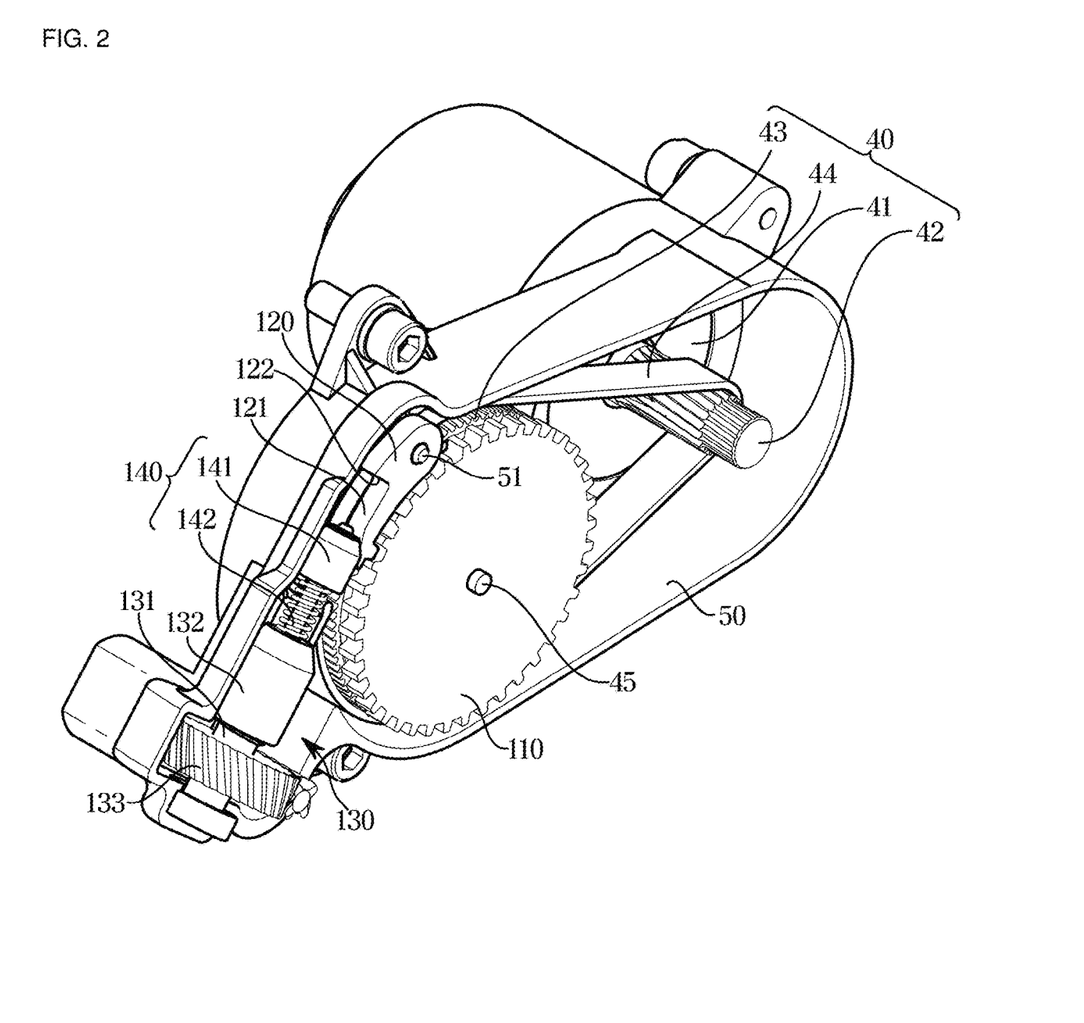
FIG. 2 is a perspective view of a parking actuator according to an embodiment of the disclosure.
Figure 3:
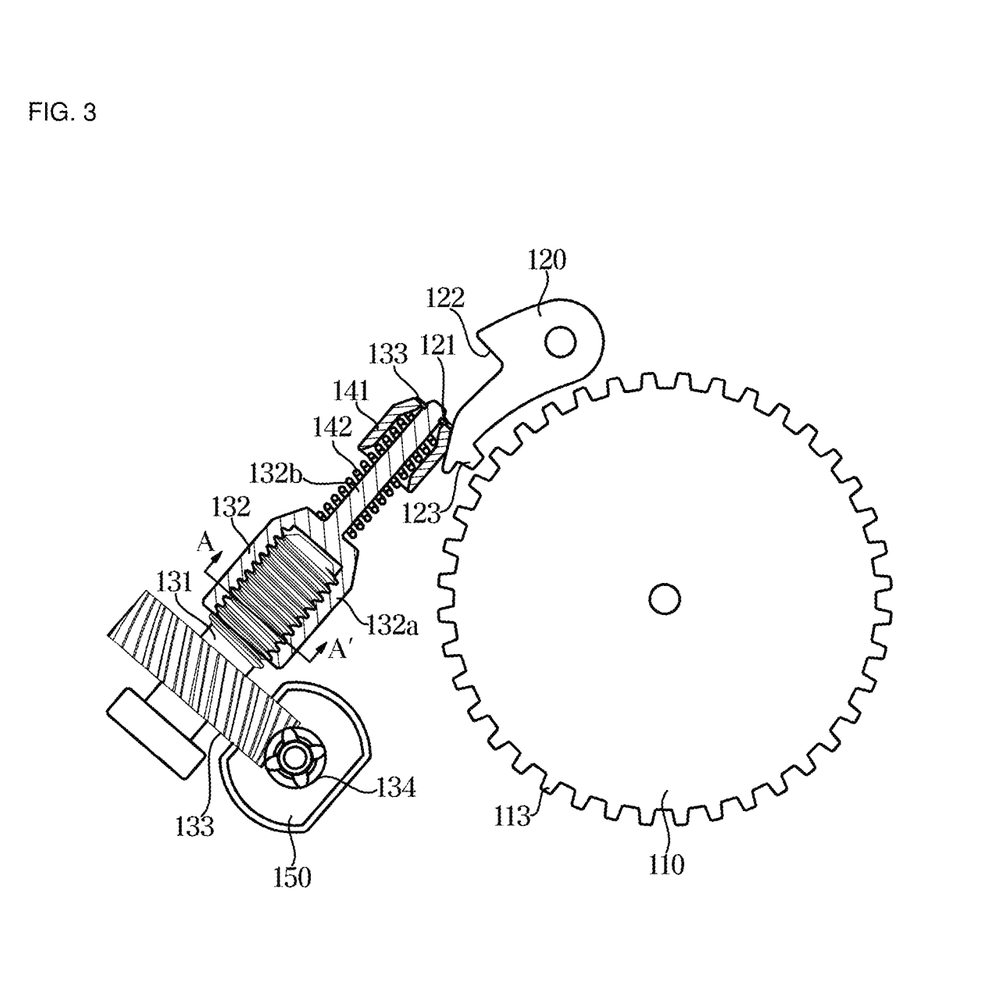
FIG. 3 is an enlarged cross-sectional view of a main part of the parking actuator according to an embodiment of the disclosure.
Figure 4:
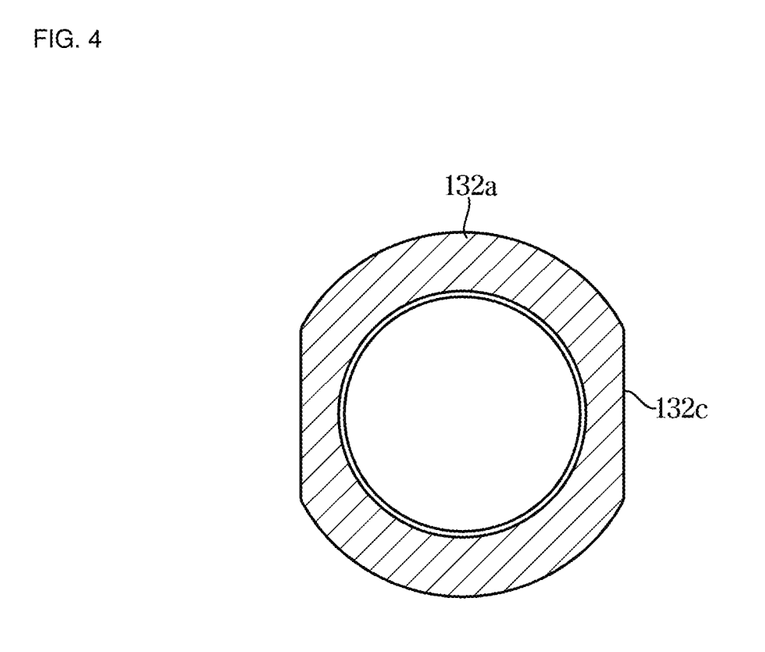
FIG. 4 is a cross-sectional view taken along a line A-A' in FIG. 3.

FIG. 2 is a perspective view of the parking actuator 100 according to an embodiment of the disclosure, FIG. 3 is an enlarged cross-sectional view of a main part of the parking actuator 100 according to an embodiment of the disclosure, and FIG. 4 is a cross-sectional view taken along a line A-A' in FIG. 3.

Referring to FIGS. 2 to 5, the parking actuator 100 includes the parking gear 110 connected to the brake actuator 40 to be rotatable together, a parking lever 120 provided such that one side is hingedly fixed and the other side is engaged with the parking gear 110, a parking motor 150 provided to generate power, a power conversion unit 130 provided to convert a rotational motion of the parking motor 150 into a linear motion, and a pressing unit 140 installed on a nut member 132 to press the parking lever 120 by the nut member 132 moved forward or backward.

Herein, an operation in which the parking actuator 100 operates to fix the parking gear 110 to maintain a braking state is referred to as a parking mode, and an operation in which the parking actuator 100 operates to release the fixing of the parking gear 110 is referred to as a release of the parking mode.

The parking gear 110 is connected to the reduction gear unit to rotate together when the reduction gear unit rotates and to be fixed together when the reduction gear unit is fixed. Preferably, the parking gear 110 may be coaxially connected to the reduction gear 43 to rotate together with the reduction gear 43. However, various modifications are possible, such as the parking gear 110 being directly connected to the driving motor 41 and provided on a different axis through another gear separate from the reduction gear 43, and it should be understood that such the modifications are the same as those of the present embodiment as long as the driving of the brake actuator 40 is limited together when the rotation of the parking gear 110 is limited as the parking gear 110 is connected to the brake actuator 40.

The parking gear 110 may be provided with a plurality of gear teeth 113 on an outer circumferential surface thereof to be engaged with a gear tooth 123 of the parking lever 120.

Preferably, the parking gear 110 may be provided to have an outer diameter similar to that of the reduction gear 43. This is because the larger the outer diameter of the parking gear 110, the greater the number of the gear teeth 113 of the parking gear 110, and the higher the sensitivity of the parking lever 120 to be engaged.

The parking lever 120 may be provided such that one side thereof may be hingedly fixed to the housing 50 and the other side thereof may be rotated toward the parking gear 110 to be engaged the parking gear 110. Specifically, the parking lever 120 may be hingedly fixed by a rotation pin 51 that is inserted into the housing 50 surrounding the parking actuator 100, and may be elastically supported by a torsion spring (not shown) that is inserted into the rotation pin 51 to separate the parking lever 120 from the parking gear 110. The torsion spring (not shown) has one end fixed to the housing 50 and the other end supported on the parking lever 120 to provide an elastic force to the parking lever 120 when a pressing member 141 moves backward so that the parking lever 120 is spaced apart from the parking gear 110 to release the parking braking.

The parking lever 120 may be provided with one surface facing the parking gear 110 and on which the gear tooth 123 engaged with the parking gear 110 is formed, and the other surface having a pressing surface 121 in close contact with the pressing member 141 and a stepped surface 122 formed to be stepped on the pressing surface 121.

The parking lever 120 may be provided to gradually decrease in width along a longitudinal direction, and the pressing surface 121 may be bent to be gradually pressed by the pressing member 141 when the pressing member 141 moves forward. That is, the pressing surface 121 may be bent such that the parking lever 120 gradually rotates toward the parking gear 110 when the pressing member 141 moves forward.

The stepped surface 122 may be formed to be stepped on the pressing surface 121 to prevent excessive advancement of the nut member 132. Specifically, the stepped surface 122 may be provided on an extension line in advancing and retreating direction of the nut member 132 to prevent the advancing movement of the nut member 132 by coming into contact with an end of a pin 132b when the nut member 132 moves forward excessively, thereby preventing the nut member 132 from being separated from a spindle member 131 by excessively advancing so that the screw coupling is released.

The parking motor 150 generates power to drive the parking actuator 100. Because the parking motor 150 only needs to provide enough power to press the parking lever 120 through the power conversion unit 130 and the pressing unit 140, the parking motor 150 may be provided as a DC motor having a relatively low output compared to the driving motor 41 of the brake actuator 40.

The power conversion unit 130 is provided to convert the rotational motion of the parking motor 150 into a linear motion to press and release the parking lever 120.

Specifically, the power conversion unit 130 includes the spindle member 131 provided to rotate by receiving power from the parking motor 150, the nut member 132 screwed to the spindle member 131 to move forward or backward, a first worm gear 134 provided on a rotation shaft of the parking motor 150, and a second worm gear 133 engaged with the first worm gear 134 and to which the spindle member 131 is coupled through the center thereof.

The nut member 132 may include a nut body 132a having a female thread engaged with a male thread formed on an outer circumferential surface of the spindle member 131, and the pin 132b extending in a longitudinal direction from the nut body 132a and through and to which the pressing member 141 penetrates and is installed. A stopper 133 extending outward in a radial direction may be fastened to an end of the pin 132b to prevent separation of the pressing member 141. Accordingly, as a coil spring-shaped elastic member 142 and the cylindrical pressing member 141 are sequentially inserted into the pin 132b and then the stopper 133 is fastened to the pin 132b, the pressing member 141 may move within a length range of the pin 132b.

A rotation preventing surface 132c may be provided on one side of an outer circumferential surface of the nut body 132a so that the nut member 132 does not rotate together when the spindle member 131 rotates. Specifically, the rotation preventing surface 132c may be formed to correspond to a rotation preventing portion (not shown) provided on the housing 50 so that the nut member 132 does not rotate together when the spindle member 131 rotates.

For example, the rotation preventing surface 132c may be formed by a flat surface recessed from on one side of the outer circumferential surface of the nut body 132a (see FIG. 4), and a portion of the housing 50 in which the nut body 132a is accommodated may be provided with the rotation preventing portion (not shown) protruding as a flat surface in a cylindrical space.

The pressing unit 140 is installed on the nut member 132 to press the parking lever 120 by the move forward or backward of the nut member 132. Specifically, the pressing unit 140 includes the cylindrical pressing member 141 installed to penetrate through the pin 132b to press the parking lever 120, and the elastic member 142 interposed between the pressing member 141 and the nut member 132 to elastically support the pressing member 141.

The pressing member 141 is provided in a cylindrical shape such that the pin 132b penetrates through the center thereof and a front edge portion thereof facing the parking lever 120 is bent, so that the pressing member 141 may linearly press the pressing surface 121 of the parking lever 120 when the pressing member 141 moves forward or backward. In addition, at least a portion of an outer circumferential surface of the pressing member 141 may always maintain a state of being in contact with the parking lever 120, and preferably, the bent surface of the pressing member 141 is provided to be in contact with the pressing surface 121 of the parking lever 120 when the parking mode is released.

The elastic member 142 may be provided as a coil spring, and is installed such that the pin 132b penetrates therethrough and disposed such that one side thereof supports the nut body 132a and the other side thereof supports the pressing member 141, thereby always providing an elastic force to the pressing member 141.

An elastic modulus of the elastic member 142 is provided to be greater than an elastic modulus of the torsion spring (not shown) supporting the parking lever 120. For example, the elastic member 142 provides an elastic force greater than that of the torsion spring (not shown), so that when the nut member 132 or the pressing member 141 moves forward, the pressing member 141 may overcome a resistance force of the parking lever 120 and press the parking lever 120. A detailed description thereof will be given later in the description of the operation.

As the pressing unit 140 is composed of the pressing member 141 and the elastic member 142 for elastically supporting the pressing member 141, even when the gear tooth 123 of the parking lever 120 is not engaged normally with one of the gear teeth 113 of the parking gear 110, the pressing unit 140 allows the gear tooth 123 of the parking lever 120 to be engaged with and fixed to another one of the gear teeth 113 by using an elastic restoring force of the elastic member 142, thereby ensuring the stability of the parking mode.

Figure 8:
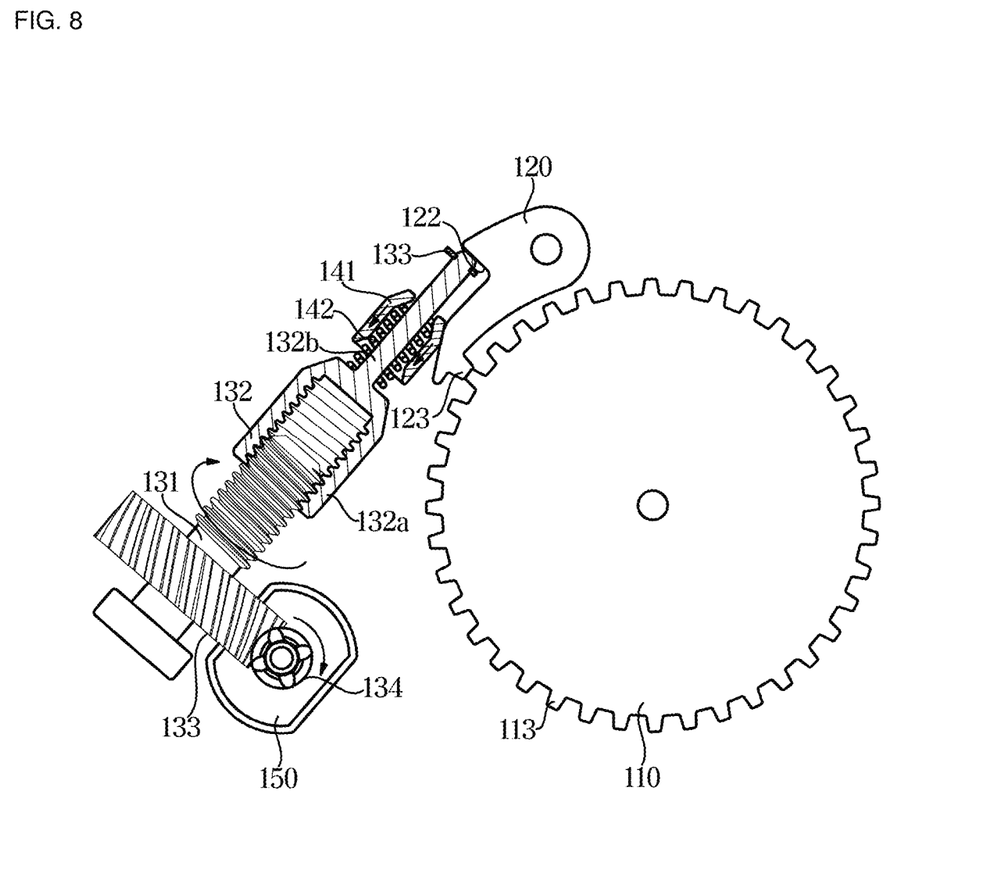
FIG. 8 is a cross-sectional view illustrating an operation of the parking actuator in an abnormal parking mode according to an embodiment of the disclosure.
Figure 9:
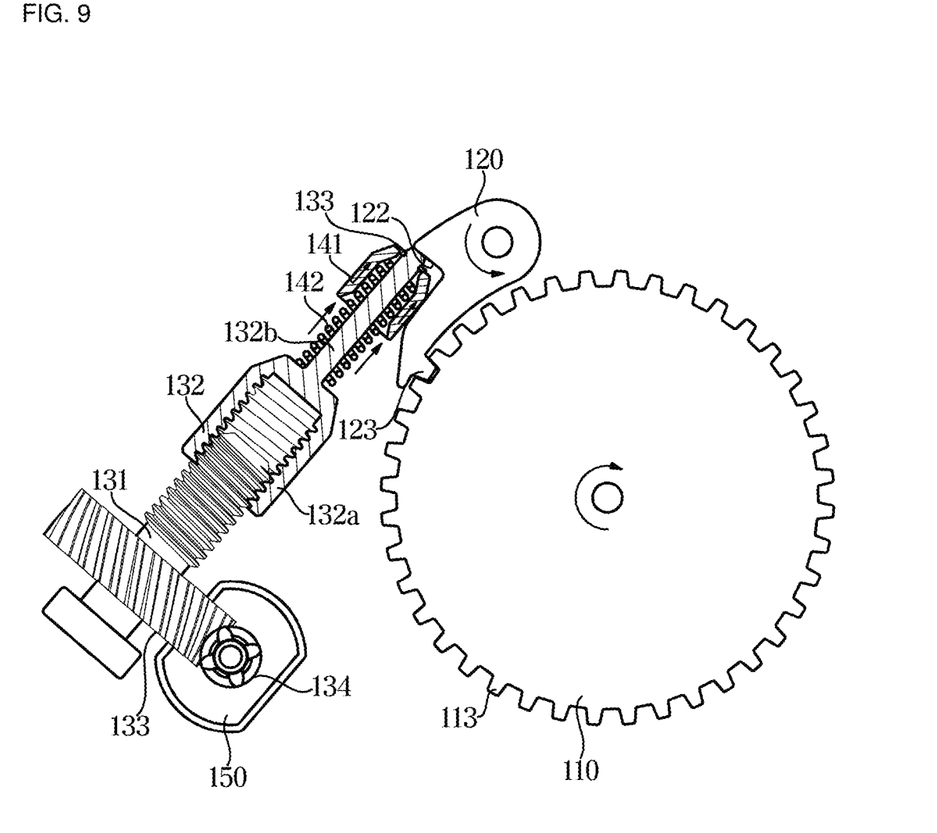
FIG. 9 is a cross-sectional view illustrating an operation of the parking actuator in the abnormal parking mode according to an embodiment of the disclosure.

More specifically, in the parking mode, when the gear tooth 123 of the parking lever 120 is not engaged with the gear tooth 113 of the parking gear 110 and the gear teeth 113 and 123 collide with each other, the nut member 132 moves forward to the stepped surface 122, but the pressing member 141 may not further move forward by the pressing surface 121 of the parking lever 120, and the elastic member 142 is compressed to have the elastic restoring force (see FIGS. 8 and 9). Thereafter, the parking gear 110 rotates in the opposite direction to a braking direction due to a reaction force such as a reaction force of the brake pad or a roll-back action of the piston 60, the pressing member 141 moves forward by the elastic restoring force of the elastic member 142 to press the parking lever 120, and the gear tooth 123 of the parking lever 120 is engaged with the gear tooth 113 of the parking gear 110. A detailed description thereof will be given later in the description of the operation.

The housing 50 is provided to accommodate the parking gear, 110, the parking lever 120, the parking motor 150, the power conversion unit 130, and the pressing unit 140, which are described above, and to surround a driving shaft of the reduction gear unit of the driving motor 41. In a space accommodating the nut member 132 among inner spaces of the housing 50, the rotation preventing portion (not shown) is provided to prevent rotation of the nut member 132, and the rotation preventing portion (not shown) may be provided in a shape corresponding to the rotation preventing surface 132c of the nut member 132.

Hereinafter, an operation of the parking actuator 100 according to an embodiment of the disclosure will be described.

Figure 5:
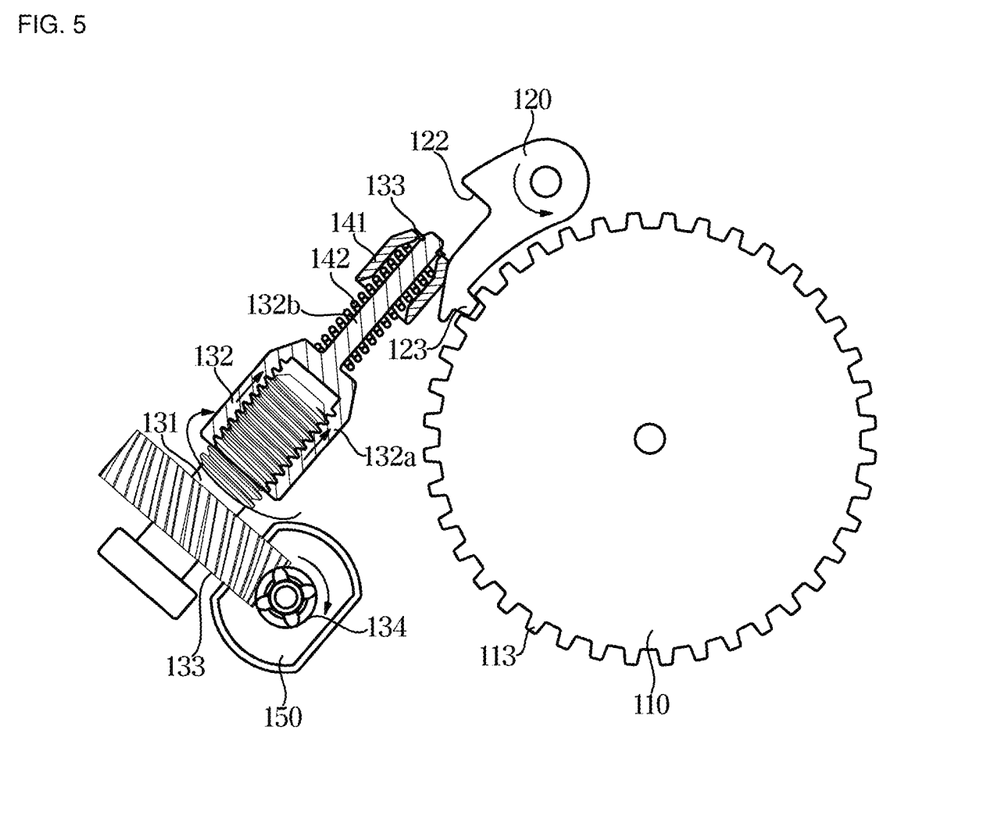
FIG. 5 is a cross-sectional view illustrating an operation of the parking actuator in a normal parking mode according to an embodiment of the disclosure.
Figure 6:
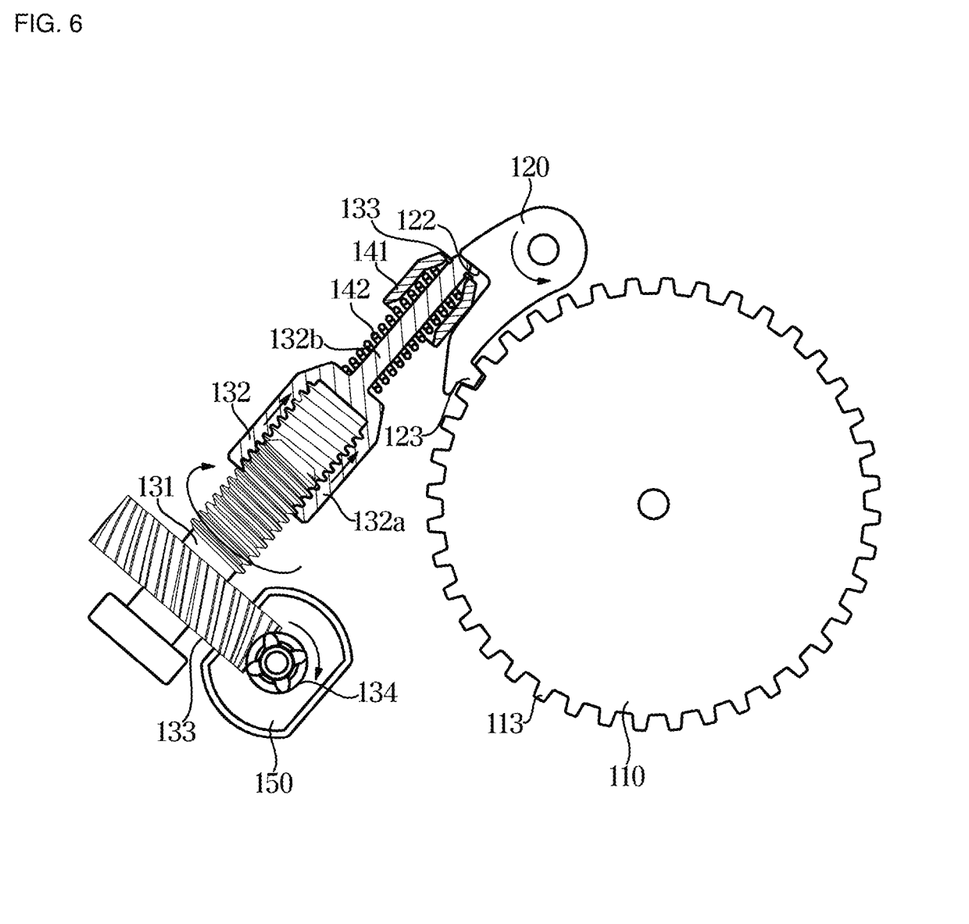
FIG. 6 is a cross-sectional view illustrating a state in which the normal parking mode of the parking actuator according to an embodiment of the disclosure is completed.
Figure 7:
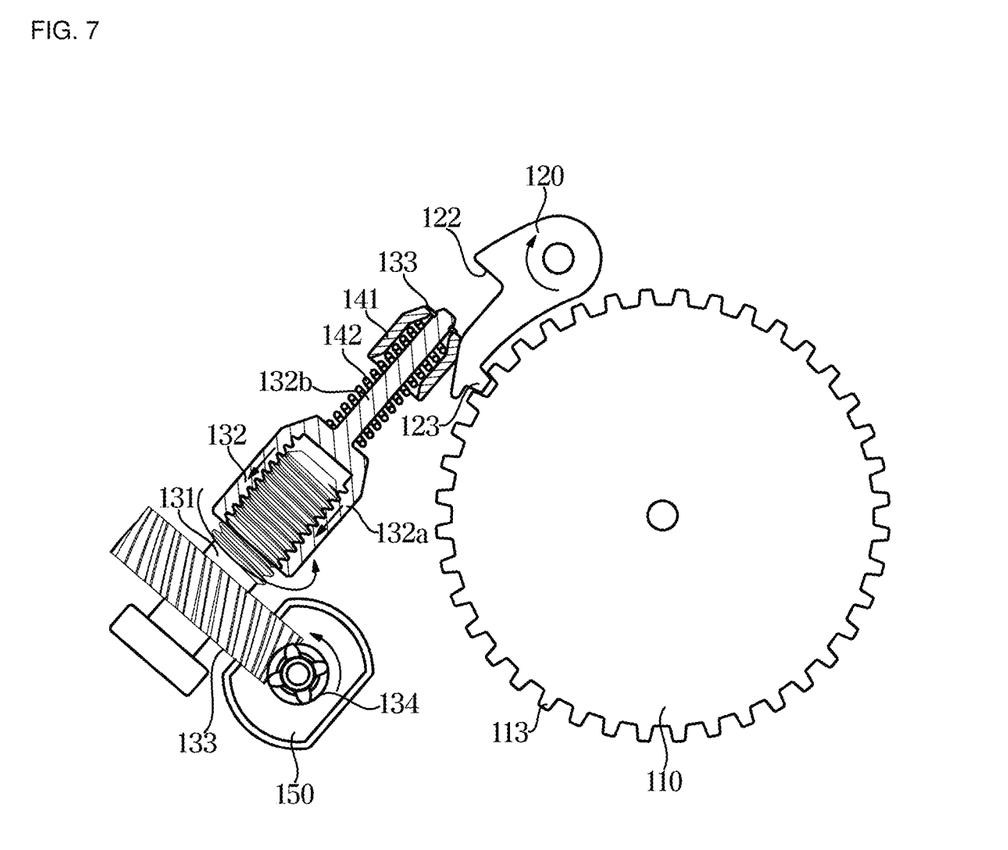
FIG. 7 is a cross-sectional view illustrating an operation of the parking actuator in a release of the normal parking mode according to an embodiment of the disclosure.

FIGS. 5 and 6 are cross-sectional views illustrating operations of the parking actuator 100 in a normal parking mode according to an embodiment of the disclosure, and FIG. 7 is a cross-sectional view illustrating an operation of the parking actuator 100 in a release of the normal parking mode according to an embodiment of the disclosure.

The parking actuator 100 according to an embodiment of the disclosure may operate in a parking mode for maintaining the parking braking state of the vehicle, and a release of the parking mode for releasing the parking braking of the vehicle.

Referring to FIGS. 5 and 6, the electromechanical brake according to an embodiment of the disclosure performs the parking braking as the piston 60 presses the pad plate 11 by the operation of the brake actuator 40 that receives an electrical signal from the electronic control unit (ECU, not shown). For example, as the driving force of the brake actuator 40 presses the pad plate 11 through the spindle unit 31, the nut unit 32 and the piston 60, and the brake pad 11 presses the disk, the braking is performed.

When the parking mode is executed, the parking actuator 100 operates by receiving an electrical signal from the electronic control unit (ECU, not shown).

Specifically, in the parking mode, the parking motor 150 generates a rotational driving force to rotate the spindle member 131 through the first worm gear 134 and the second worm gear 133. By the rotation of the spindle member 131, the nut member 132 moves forward relative to the spindle member 131, and the pressing member 141 moves forward together with the nut member 132 while being elastically supported by the elastic member 142 and pressing the pressing surface 121 of the parking lever 120.

The nut member 132 moves forward until the end of the pin 132b comes into contact with the stepped surface 122, and the pressing member 141 presses the parking lever 120 while sliding from one end to the other end in a state of being in contact with the bent surface of the pressing surface 121. The pressing member 141 may press the parking lever 120 because an elastic reaction force of the torsion spring (not shown) of the parking lever 120 is provided to be weaker than the elastic force of the elastic member 142 supporting the pressing member 141.

As the pressing member 141 presses the parking lever 120, the parking lever 120 rotates toward the parking gear 110 so that the gear tooth 123 of the parking lever 120 and the gear tooth 113 of the parking gear 110 are engaged with each other. That is, the parking gear 110 is fixed by the parking lever 120 so that the rotation of the parking gear 110 is limited, and thus the operation of the brake actuator 40 including the reduction gear unit connected to the parking gear 110 is limited.

Referring to HG. 7, in the release of the parking mode to release the parking braking state, the parking motor 150 receives an electrical signal from the electronic control unit (ECU, not shown) and generates a rotational driving force in a direction opposite to the rotational direction in the parking mode. Accordingly, the spindle member 131 rotates through the first worm gear 134 and the second worm gear 133, the nut member 132, which has moved forward, moves backward relative to the spindle member 131, and the pressing member 141 also moves backward together.

Accordingly, the parking lever 120 rotates in a direction of being spaced apart from the parking gear 110 by an elastic restoring force of the torsion spring (not shown), and the gear tooth 123 of the parking lever 120 is spaced apart from the gear tooth 113 of the parking gear 110 so that the parking gear 110 is released from the locked state and is rotatable. As the fixing of the parking gear 110 is released, the operation of the brake actuator 40 such as the reduction gear unit becomes possible, and the braking state of the vehicle may be released by the operation of the brake actuator 40.

FIGS. 8 and 9 are cross-sectional views illustrating operations of the parking actuator in an abnormal parking mode according to an embodiment of the disclosure.

Referring to FIG. 8, in an abnormal parking mode of the parking actuator 100, the gear tooth 123 of the parking lever 120 and the gear tooth 113 of the parking gear 110 collide with each other, so that the parking lever 120 and the parking gear 110 are not engaged with each other.

Specifically, the spindle member 131 rotates by the rotational driving force of the parking motor 150 and the nut member 132 moves forward, so that the pressing member 141 presses the parking lever 120. At this time, depending on a rotational position of the parking gear 110, the gear tooth 123 of the parking lever 120 and the gear tooth 113 of the parking gear 110 may be not engaged with each other and may collide with each other. Accordingly, even when the pressing member 141 presses the parking lever 120, due to the collision between the gear teeth 113 and 123, the parking lever 120 does not rotate toward the parking gear 110, and the gear teeth 113 and 123 are not engaged with each other.

On the other hand, even when the parking lever 120 does not rotate, the spindle member 131 continues to rotate so that the nut member 132 moves forward, but the pressing member 141 is blocked from advancing by the pressing surface 121 and presses the elastic member 142. At this time, the elastic member 142 is gradually elastically deformed and the elastic restoring force is stored. Accordingly, the parking gear 110 is provided in a state in which rotation is not limited by the parking lever 120.

Thereafter, when the reduction gear rotates in a braking release direction due to a reaction force such as a reaction force of the brake pad or a roll-back action of the piston 60, the parking gear 110 also rotates in the braking release direction. Accordingly, the pressing member 141 moves forward by the elastic restoring force of the elastic member 142 to press the parking lever 120 so that the parking lever 120 rotates toward the parking gear 110, and at the same time, the gear tooth 123 of the parking lever 120 and the gear tooth 113 of the parking gear 110 are engaged with each other to limit the rotation of the parking gear 110.

Therefore, the parking actuator 100 of the disclosure may perform the parking mode by the operation of the pressing unit 140 even when the parking gear 110 and the parking lever 120 collide with each other and the gear teeth 113 and 123 are not normally engaged with each other. In this case, because the parking mode may be performed by reverse rotation of about half of an interval between the adjacent gear teeth 113 of the parking gear 110, a large loss does not occur in the fastening force of the brake actuator 40, and the parking braking of the vehicle is not significantly affected.

As is apparent from the above, a parking actuator and an electromechanical brake including the same according to the present embodiment can minimize consumption of current for maintaining a parking braking state of a vehicle.

Further, the parking actuator and the electromechanical brake including the same according to the present embodiment can ensure safety by being configured such that the next gear tooth is engaged even in a case where gear teeth are not engaged with each other when a parking gear is fixed.

Further, the parking actuator and the electromechanical brake including the same according to the present embodiment can be driven even with a small output during operation.

Further, the parking actuator and the electromechanical brake including the same according to the present embodiment can suppress a rolling phenomenon of a vehicle during parking braking.

Further, the parking actuator and the electromechanical brake including the same according to the present embodiment can have a simple driving method which facilitates a parking operation and a parking release operation.

While the disclosure has been particularly described with reference to exemplary embodiments, it should be understood by those of skilled in the art that various changes in form and details may be made without departing from the spirit and scope of the disclosure.

What is claimed is:

1. A parking actuator connected to a brake actuator that performs braking of a vehicle, the parking actuator comprising:
   a parking gear connected to the brake actuator to be rotatable together;
   a parking lever having one side hingedly fixed and the other side engaged with the parking gear;
   a parking motor provided to generate power;
   a power conversion unit comprising a spindle member rotating by receiving a rotational driving force of the parking motor and a nut member screwed to the spindle member to move forward or backward; and
   a pressing unit installed on the nut member to press the parking lever by the nut member moved forward or backward,
   wherein a rotation shaft of the parking motor is arranged to be substantially parallel to a rotation axis of the parking gear,
   wherein the pressing unit comprises a pressing member provided to penetrate through an end of the nut member to be movable relative to the nut member and to press the parking lever; and an elastic member interposed between the pressing member and the nut member to elastically support the pressing member,
   wherein the nut member includes a nut body having a female thread engaged with a male thread formed on an outer circumferential surface of the spindle member; and a pin extending in a longitudinal direction from the nut body so that the pressing unit is installed, wherein the parking lever includes a pressing surface in close contact with the pressing member and a stepped surface formed to be stepped on the pressing surface, and wherein the stepped surface is provided on an extension line in advancing and retreating direction of the nut member to prevent the advancing movement of the nut member by coming into contact with an end of the pin.

2. The parking actuator according to claim 1, wherein the pin extends in a longitudinal direction from the nut body so that the pressing unit is installed.

3. The parking actuator according to claim 2, wherein the pin comprises a stopper extending in a radial direction from an end thereof to prevent separation of the pressing member.

4. The parking actuator according to claim 2, wherein the elastic member is provided as a coil spring through which the pin penetrates and having one side supporting the nut body and the other side supporting the pressing member.

5. The parking actuator according to claim 2, wherein the nut body has a rotation preventing surface formed on one side of an outer circumferential surface thereof so as not to rotate together with the spindle member.

6. The parking actuator according to claim 1, wherein the parking lever is provided with:
one surface on which a gear tooth is formed to be engaged with the parking gear; and
an other surface having a stepped surface formed to be stepped and positioned on an extension line in advancing and retreating direction of the nut member and a pressing surface extending from the stepped surface to be in close contact with the pressing member.

7. The parking actuator according to claim 6, wherein the pressing surface is bent such that the parking lever gradually rotates toward the parking gear when the pressing member moves forward.

8. The parking actuator according to claim 1, wherein the pressing member is provided in a cylindrical shape, and a front edge portion of the pressing member is formed to be bent.

9. The parking actuator according to claim 1, wherein the pressing member presses the parking lever by the advancing movement of the nut member or an elastic force of the elastic member during parking driving to engage a gear tooth of the parking lever with the parking gear.

10. The parking actuator according to claim 1, wherein the power conversion unit comprises:
a first worm gear provided on the rotation shaft of the parking motor; and a second worm gear engaged with the first worm gear and to which the spindle member is coupled to the center thereof.

11. The parking actuator according to claim 1, further comprising
a housing provided to accommodate the parking gear, the parking lever, the parking motor, the power conversion unit, and the pressing unit,
wherein the parking lever is hingedly fixed to the housing.

12. An electromechanical brake comprising the parking actuator according to claim 1.

13. The electromechanical brake according to claim 12, further comprising:
a driving motor provided to generate a rotational driving force;
a reduction gear unit connected to the driving motor to adjust a gear ratio;
a power transmission device provided to convert a rotational motion of the reduction gear unit into a linear motion; and
a piston provided to receive power from the power transmission device and press a pad plate.

14. The parking actuator according to claim 1, wherein the power conversion unit comprises at least two worm gears including one worm gear mounted to the rotation shaft of the parking motor and another worm gear rotatably engaged with the one worm gear such that the rotation shaft of the parking motor is arranged to be substantially parallel to the rotation axis of the parking gear.

* * * * *